United States Patent [19]

Boudreaux, Jr. et al.

[11] Patent Number: 4,668,760

[45] **Date of Patent: * May 26, 1987**

[54] MELT PROCESSABLE OPTICALLY ANISOTROPIC POLYMER PROCESSING

[75] Inventors: Edwin Boudreaux, Jr.; David M. Lee; David A. Hutchings, all of Newark; Gloria M. Sieloff, Pataskala; G. Fred Willard, Newark, all of Ohio

[73] Assignee: Owens-Corning Fiberglass Corp., Toledo, Ohio

[ * ] Notice: The portion of the term of this patent subsequent to Jul. 15, 2003 has been disclaimed.

[21] Appl. No.: 819,945

[22] Filed: Jan. 17, 1986

Related U.S. Application Data

[63] Continuation-in-part of Ser. No. 581,166, Feb. 17, 1984, Pat. No. 4,600,765.

[51] Int. Cl.[4] .............................................. C08G 63/18

[52] U.S. Cl. .................................... 528/193; 528/176; 528/190; 528/191; 528/194; 528/271; 568/716

[58] Field of Search ............... 528/176, 190, 191, 193, 528/194, 271

[56] References Cited

U.S. PATENT DOCUMENTS

| | | | |
|---|---|---|---|
| 2,172,374 | 9/1939 | Flory | 260/561 |
| 3,160,602 | 12/1964 | Kautor | 260/47 |
| 3,975,487 | 8/1976 | Cottis et al. | 260/47 |
| 4,118,372 | 10/1978 | Schaefgen | 528/190 |
| 4,159,365 | 6/1979 | Payet | 428/364 |
| 4,183,895 | 1/1980 | Luise | 528/191 |
| 4,247,514 | 1/1981 | Luise | 528/191 |
| 4,287,332 | 9/1981 | Jackson et al. | 528/176 |
| 4,342,862 | 9/1982 | Jackson et al. | 528/176 |
| 4,416,839 | 11/1983 | Inata et al. | 521/64 |
| 4,426,511 | 1/1984 | Asada et al. | 528/128 |
| 4,447,593 | 5/1984 | Funakoshi et al. | 528/176 |
| 4,474,938 | 10/1984 | Richardson | 528/176 |
| 4,529,565 | 7/1985 | Kasatani et al. | 528/176 X |
| 4,542,203 | 9/1985 | Ueno et al. | 528/126 |

FOREIGN PATENT DOCUMENTS

| | | | |
|---|---|---|---|
| WO85/03712 | 8/1985 | PCT Int'l Appl. | 528/176 |

OTHER PUBLICATIONS

Gastoli et al., "Chemical Kinetics and Diffusion", *Journal of Applied Polymer Science,* vol. 29, 1984, pp. 2873–2887.

Gaymans et al., "Nylon 6 Polymerization in the Solid State", *Journal of Applied Polymer Science,* vol. 27, 1982, pp. 2513–2526.

Biesenberger, "Two Routes to Effective Resin Devolatiliazation"—*Plastics Engineering,* 1984, pp. 28–31.

J. T. Lindt, "Solid State Polycondensation of Polybutylene Terephthalate"—*Proceedings of the Second Internatinal Conference on Reactive Processing of Polymers.*

Rodriguez, Principles of Polymer Systems, 1970, pp. 418, 419, 420 & 421.

Tadmor & Gagos, Principles of Polymer Processing, 1979, pp. 121 & 122.

Beisenberger & Sebastian, Principles of Polymerization Engineering, 1983, pp. 573, 574 & 575.

Biesenberger (editor), Devolatilization of Polymers Fundamentals-Equipment-Applications, 1983, preface and table of contents.

*Primary Examiner*—Lucille M. Phynes

[57] ABSTRACT

A process comprising synthesizing a liquid crystal polyester consisting essentially of recurring moieties of formulas:

I.

and

II.

$CH_3$—CH and moiety III or IV wherein III is and IV is $CH_3$ wherein the mole ratio of moiety II to moiety III, when present, is 1:4 to 2:1 and wherein the mole ratio of moiety II to moiety IV, when present, is 2:8 to 1:9 and devolatilizing said liquid crystal polyester prior to shaping such polyester into an article and then shaping said devolatilized polyester into said article.

6 Claims, No Drawings

MELT PROCESSABLE OPTICALLY ANISOTROPIC POLYMER PROCESSING

CROSS REFERENCES

This is a continuation-in-part application of U.S. Ser. No. 581,166, filed Feb. 17, 1984, now U.S. Pat. No. 4,600,765, which application is hereby incorporated by reference.

TECHNICAL FIELD

The present invention relates to linear polyesters, and more particularly, it relates to melt processable optically anisotropic liquid crystal polyesters.

BACKGROUND AND SUMMARY

Liquid crystal polyesters, or those which exhibit optical anisotropy in the melt phase, are well known in the art. Numerous patents describe such polyesters and some are, for example, generally described in the article by W. J. Jackson, Jr. appearing in the *British Polymer Journal* December 1980 entitled, "Liquid Crystal Polymers IV Liquid Crystalline Aromatic Polyesters".

Some aromatic polyesters exhibit optical anisotropy in the molten state and can be melt spun into crystalline fibers which upon subsequent heat treatment further crystallize and substantially increase in tenacity. Such heat treated polyester fibers can be used for numerous purposes such as, for example, in tire cords and in other industrial and consumer products where high strength and low weight with its attendant economic and other advantages are desired. In addition to their use in the form of fibers, such polyesters can also be formed by molding, for example, injection molding, into a wide variety of substrates which will have outstanding stiffness and toughness and strength. Specific applications for such type liquid crystal polyesters are as high strength reinforcements for numerous thermoplastic and thermosetting polymer materials or as a matrix resin for various molded articles.

In accordance with the present invention, an improved low cost, high performance thermotropic polyester, which is optically anistropic in the melt, is manufactured and processed into usefully shaped articles, as by being formed into fibers or molded into other useful articles using conventional thermoplastic polymer processing and forming technology. The processing includes a step of devolatilizing the polyester after synthesis but prior to subjecting the polyester to conventional shaping operations, such as fiberization or molding, e.g., injection molding, either with or without compounding.

The melt spinnable, liquid crystal polymers contemplated herein are of fiber forming molecular weight and exhibit optical anisotropy in the liquid phase and consist essentially of recurring moieties.

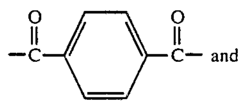

I.

-continued

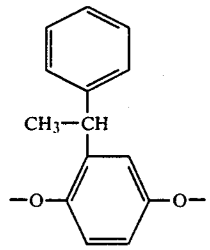

II.

and, moiety III or moiety IV wherein

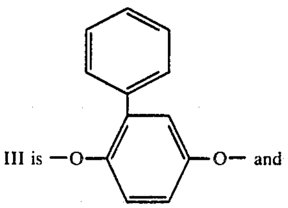

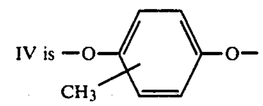

wherein the mole ratio of moiety II to moiety III, when present, is 1:4 to 2:1 and wherein the mole ratio of moiety II to moiety IV, when present, is 2:8 to 1:9.

DESCRIPTION AND INDUSTRIAL EXPLOITATION

The polymers contemplated herein are formed by reacting polyester forming precursors of said moieties under polyester forming reaction conditions. Thus, they may be formed by solution polymerization, which is a preferred technique, as well as by melt or emulsion polymerization. They may be formed from the diacids, diacid halides, diols or esters by transesterification. In the preferred mode of practicing the invention, the polymers will be synthesized by solution polymerization techniques in which the precursor for moiety I is terephthaloyl chloride. The preferred precursor for moiety II is (1-phenylethyl) hydroquinone, and the preferred precursor for moiety III is phenylhydroquinone and the preferred precursor for moiety IV is methylhydroquinone.

Upon synthesizing and recovering the polymer, it is devolatilized, and the polymer may then be formed into usefully shaped articles by conventional techniques. Prior to shaping the polymer, and subsequent to devolatization, adjuvants, e.g., fillers, colorants, lubricants, can be incorporated into the polyester as can reinforcing fibers such as metal, glass, carbon or other organic polymeric fibers. Thus, for example, the polymer, after devolatilization, can be extruded and formed into pellets to provide a densified product which product may then be fed to another extruder and formed into various articles such as fibers by use of a spinneret or any suitable die to form films or sheets. In addition, the material may be injection or compression molded into various configurations using conventional molding techniques. When formed into fibers, it is desirable to subject the fibers to a heat treatment. This may be accomplished by simply heating the fibers, with the fibers being in a relaxed condition, in an inert atmosphere, such as, for example, a flow of nitrogen, to a sufficient temperature and for a sufficient period of time to increase the tenacity. Such a heat treatment is also desirable for other objects, e.g., sheets, films and molded articles.

The specific reactants employed to form the polyester will be routinely selected by those skilled in the art, and it will be readily apparent to them that polymer grade reactants should be employed. Additionally, for most outstanding results, it is desirable that stoichiometric amounts of the reactants be employed. In passing, it should be mentioned that the preferred polyesters are terpolyesters of moieties I, II and III, wherein moieties II and III will be approximately in equimolar amounts.

Polyesters of moieties I, II and IV are generally less preferred as they have lower tenacities (e.g., 10-15 grams per denier) and a lower tensile modulus (e.g., 250-500 grams per denier).

As previously indicated, moiety II is preferably incorporated into the thermotropic polyester by employing (1-phenylethyl) hydroquinone as the monomer. Additionally, as indicated, such moiety may be incorporated into the polyester by using an ester derivative thereof. Such ester derivatives will be routinely manufactured by those skilled in the art employing (1-phenylethyl) hydroquinone as a starting material. An outstanding technique for synthesizing (1-phenylethyl) hydroquinone is to react styrene with hydroquinone in the presence of an organic diluent, preferably an ether, and in the presence of effective reaction stimulating amounts of a Lewis acid. The reaction is preferably conducted at approximately 135° C. to about 145° C., and the crude product is purified by high vacuum batch distillation. In the preferred technique, the diluent will be tetraethyleneglycol dimethylether, that is, a material of the formula $CH_3 (OCH_2)_4OCH_3$ which is commercially available under the trade designation Tetraglyme material. The preferred Lewis acid is para-toluene sulfonic acid, and, in this case, it is preferred to purify the crude (1-phenylethyl) hydroquinone product by distillation employing sodium hydrogen sulfite to neutralize the para-toluene sulfonic acid catalyst.

The preferred technique, alluded to above, for synthesizing the novel, melt processable, liquid crystal aromatio polyesters of the present invention is a solution polymerization technique, and, as also indicated above, it is preferred that the reactants be terephthaloyl chloride, (1-phenylethyl) hydroquinone, phenylhydroquinone or methylhydroquinone. Obviously, such reaction will be conducted in the presence of a hydrochloric acid trap. Suitable hydrochloric acid traps, or scavengers, are the organic bases, for example, aliphatic and aromatic amines, especially tertiary amines. The preferred trap is pyridine, and it is preferred to employ an access, for example, up to about 50 percent molar excess of such material. The solvents employed for the solution polymerization will be routinely selected by those skilled in the art, but it is generally preferred to employ the low molecular weight chlorinated hydrocarbond, such as, for example, the fully or partially chlorinated $C_1$-$C_3$ alkanes like trichloromethane, trichloroethane and dichloromethane being preferred.

While the above describes the present invention with sufficient particularity to enable those skilled in the art to make and use same, nonetheless, a method of industrially exploiting the present invention follows.

PREPARATION OF (1-PHENYLETHYL) HYDROQUINONE

Into a 50 liter three-necked round-bottom flask, there is charged 5 Kg (45.4 moles) of hydroquinone (Technical Hydroquinone available from Eastman Chemical Products, Inc.). Additionally, there is charged 10 liters of Tetraglyme material and 60 grams (0.32 moles) of para-toluene sulfonic acid monohydrate. A mechanical stirrer with a ground glass shaft is employed, and, while stirring slowly, the reagent mixture is warmed to about 140° C. While maintaining that temperature, 4.166 Kg (40 moles0 of styrene is added over approximately a 90-minute period. During the addition of the styrene, a slight exothermic reaction sets in, and the temperature is maintained at approximately 140° C. plus or minus about 5° C. After the styrene addition is finished, the reaction mixture is held at that temperature for approximately 5 hours after which time the heating and stirring is turned off and the mixture allowed to cool overnight. The crude product has the appearance of a heavy motor oil both in relative viscosity and color, and it is homogeneous and free of suspended solids. The yield is about 19.316 Kg.

The crude product is purified by high vacuum batch distillation employing a 12 liter flask reboiler with agitator and vacuum, a 4 ft.×2" column packed with about 30" of crimped wire mesh packing, a cooled refluxed condenser, a heat traced reflux splitter, receiver and associated piping. In a typical distillation, approximately 10 Kg of crude product is charged employing about 31 grams of sodium hydrogen sulfite to neutralize the para-toluene sulfonic acid catalyst. Distillation breakdown with one distillation is set forth in Table I. One redistillation of all the best fractions (fractions 4 & 5) easily yields a 96% plus pure (1-phenylethyl) hydroquinone product.

TABLE I (1-Phenylethyl) hydroquinone Distillation
Charge Weight 10,000 grams

| Fraction No. | Weight Grams | Temperature °C. RFX/REB @ P | Composition % Styrene | % HQ/TG | % PEHQ | % DPEHQ |
|---|---|---|---|---|---|---|
| 1 | 150 | 122°/162° @ 3 mm | 20 | 80 | — | — |
| 2 | 3030 | 130°/163° @ 2 mm | <2 | 95 | <2 | — |
| 3 | 2225 | 124°/189° @ .4 mm | — | 95 | <3 | — |
| 4 | 925 | 174°/212° @ 25 mm | — | 7 | 93 | — |
| 5 | 2103 | 198°/249° @ .6 mm | — | 4 | 94 | 2 |
| 6 | 142 | 205°/265° @ .7 mm | — | — | 50 | 50 |

TABLE I-continued (1-Phenylethyl) hydroquinone Distillation
Charge Weight 10,000 grams

| Fraction No. | Weight Grams | Temperature °C. RFX/REB @ P | Composition % Styrene | % HQ/TG | % PEHQ | % DPEHQ |
|---|---|---|---|---|---|---|
| Residue | 1378 | — | — | — | 2 | 85 |

RFX = Reflux
REB = Reboiler
P = Pressure
HQ = Hydroquinone
TG = Tetraglyme material
PEHQ = (1-Phenylethyl)hydroquinone
DPEHQ = Di(phenylethyl)hydroquinone - probably a mixture of 2,5-DPEHQ and 2,6-DPEHQ

POLYMER PROCESSING

The polymer was synthesized employing a reactor equipped with both cooling and heating and provided with a reflux condenser. The reaction was generally conducted employing a moderate nitrogen flow blanket and substantially at atmospheric pressure.

A solution of 14.7 Kg (68.7 moles) of (1-phenylethyl) hydroquinone, and 12.8 Kg (68.7 moles) of phenylhydroquinone, 48.2 Kg of methylene chloride, and 21.7 to about 26.1 Kg of pyridine was formed in the reator. The preferred order of addition is (1-phenylethyl) hydroquinone, pyridine, methylene chloride and phenylhydroquinone. Approximately 27.9 Kg (137.4 moles) of terephthaloyl chloride was dissolved in about 83.7 Kg of methylene chloride. The terephthaloyl chloride solution was added to the diol solution at the rate of approximately 2.7 Kg per minute for about 20 minutes and then about 5.4 Kg per minute for a remaining 10 minutes while stirring vigorously and substantially maintaining the reactor temperature at about 35° F (about 2° C.). It is desirable not to allow the slurry to exceed about 75° F. (about 24° C.). Upon completion of the terephthaloyl chloride/methylene chloride solution addition, the reactor was held one hour with stirring at about 2° C. There was then added 454 Kg of dionized water to the reaction mass, and the slurry temperature was raised to about 104° F. (about 41° C.) to extract the methylene chloride by distillation. After most of the methylene chloride, for example, about 85%, had been removed, the slurry temperature was increased to 185° F. (85° C.) and maintained there for approximately 1 hour with further removal of methylene chloride. The hot slurry was then fed to a rotary drum filter. The residual wet cake was then re-slurried with an additional 454 Kg of water, heated to approximately 185° F and maintained at that temperature for approximately 1 hour prior to again feeding the material to the rotary durm filter. The filtered wet cake was then again slurried using about 454 Kg of acetone with the slurry being heated to approximately 130° F. (54° C.) and holding it at that temperature for approximately 1 hour. The slurry was again filtered, and the wet cake was then combined with an additional 454 Kg of acetone followed by heating of this slurry again to approximately 130° F. and holding at that temperature for 1 hour before again separating the solids by means of a rotary drum filter. The final wet cake was dried in a vacuum oven at approximately 250° F. (121° C.) at about 20–26" (508–660 mm) Hg overnight.

The dried polymer typically has a melting point of about 320° C. and an inherent viscosity of about 0.6 to about 1.2 (dl per gram) at a concentration of about 0.5 (grams per 100 ml) in a solvent of equal volumes of trifluoroacetic acid and methylene chloride. This thermotropic polymer, which is optically anisotropic in the melt phase, is capable of being melt spun into fibers, extruded into films or sheets and, as previously indicated, compression and injection molded to form numerous substrates, for example, substrates which have utility as substrates for printed circuit boards. As previously indicated, such articles will be heat trated.

In forming fibers, e.g., having a monofilament diameter of about 10 to 30 microns, the polymer is, first of all, formed into pellets by extruding the material as a rod followed by cooling and then chopping the rod into pellets of approximately 3–5 mm in size. Typical barrel temperatures in the extruder will be about 340° C. The pellets are then supplied to another conventional extruder and are formed by means of a spinneret into fibers which can be wound onto a package using conventional winding equipment. The packages are desirably formed by winding unto a metal package core. The packages, containing relaxed fibers, are then heat treated in nitrogen atmosphere at a temperature of about 302° C. for about 22 hours (about 5 hour heat-up and about 17 hour hold period). Typical properties of heat treated crystalline monofilament fibers are as follows: tenacity typically about 18 to about 20 grams per denier (calculated based on measurement of Instron break load using 12.7 mm gauge length at a rate of 5 mm per minute, and measurement of density and cross-sectional area); a tensile modulus typically of about 510 to about 750 grams per denier; and an elongation of 3–4% to break.

It has been observed that when forming larger packages of fibers, by employing a multi-hole spinneret and gathering the individual filaments and then winding them onto a metal package core to produce packages, upon heat treating, there is a tendency for the fibers to adhere to one another on the inner portions of the package. Thus, while it is possible to rewind outer portions of fibers from the heat treated package onto a package having a cheaper, e.g., paper, core, it is very difficult to do so in a high speed economical manner when one is dealing with the inner portion of the package where the fibers have adhered, or stuck, to each other. This tendency for the fibers to adhere to each other can be reduced, if not eliminated, hence, resulting in a more commercially expedient rewinding process, by devolatilizing the polymer prior to fiber formation. This devolatilization is also beneficial for producing a molding resin. Essentially, devolatilization involves a heating of the polymer to remove volatile contaminants, including solvants and unreacted reactants. The devolatilization may be affected in the molten state or in the solid state. Devolatilization can be done in the melt state with conventional equipment such as wiped film evaporators, falling film or thin film evaporators, and devolatilizing extruders. Devolatilization is desirably done in the solid state preferably in a particulate state by use of inert gas ovens to heat the polymer. As a general matter, devolatilization will involve the heating of the polymer, with consequent removal of the volatilized contaminants such that there will generally be a weight loss on the order of at least about 0.8% by weight. A suitable range for weight loss is about 0.8% to about 3% and a highly desirable range being about 0.8% to about 1.5% by weight. Overheating during volatilization should, of course, be avoided; otherwise thermal degradation of the polymer may result, and/or the formation of a non-processable polymer may result because of the molecular weight being increased to too high a level. A convenient method for devolatilization comprises heating the polymers, preferably in particulate form, to a temperature of at least about 220° C., and preferably in the range of about 220° C. to about 350° C., for at least about four hours in an oven equipped with an inert gas purge. One suitable cycle is to heat the polymer to a temperature of on the order of about 280° C. and hold it there for on the order of about 22 hours while removing volatilized materials. As indicated, by employing the devolatilization step, the sticking of the internal portions of a package is substantially reduced. The fibers on these packages, after heat treating, generally have the tenacity, tensile modulus and elongation values previously indicated. The heat treatment of fibers produced from polymer which has been devolatilized is quite important in significantly increasing the properties of the fiber to the levels indicated.

Using devolitilized material to produce molded articles has been observed to produce articles with increased tensile strength. Thus, as an example, injection molded bars employing an as synthesized polymer (e.g., moieties I, II and III wherein the mole ratio of II:III was 1:1) exhibited typical tensile strengths of about 2,900 psi prior to heat treatment and approximately 5,000 psi after heat treatment. In contrast, when the material employed for injection molding had been previously devolatilized, typical average tensile strengths for substantially identical articles were on the order of about 10,500 psi prior to heat treatment and about 12,300 psi after heat treatment. Obviously, this is quite a significant increase.

When it is desired to add adjuvants or to compound the polymers, as for example, by the addition of reinforcements such as fiberglass, metal, carbon or even other polymeric fiber reinforcements, it will be desirable to do so subsequent to the devolatilization of the polymer and obviously prior to shaping the devolatilized polymer into a useful article. Conventional equipment can be used for incorporating such materials into the polymer but is generally preferred when compounding the polymer to employ a die-face pelletizer. As indicated above, once the polymer has been shaped, it is desirable to heat treat the shaped article to increase the properties. Relatively speaking, the improvement in properties when heat treating a molded bulk article are modest compared to heat treating fibers.

While the above describes the present invention, it will, of course, be apparent that modifications are possible which, pursuant to the patent statutes and laws, do not depart from the spirit and scope thereof.

We claim:

1. A process comprising synthesizing a liquid crystal polyester consisting essentially or recurring moieties of formulas:

I.

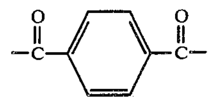

and

II.

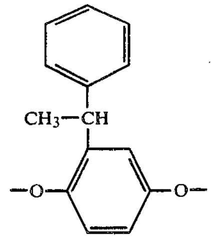

and moiety III or IV wherein III is

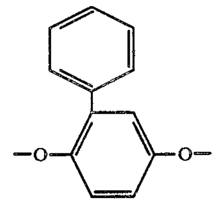

and IV is

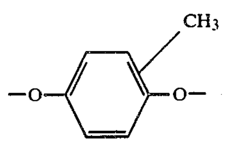

wherein the mole ratio of moiety II to moiety III, when present, is 1:4 to 2:1 and wherein the mole ratio of moiety II to moiety IV, when present, is 2:8 to 1:9 and devolatilizing said liquid crystal polyester prior to shaping such polyester into an article and then shaping said devolatilized polyester into said article.

2. The process of claim 1 wherein said synthesized polyester has an inherent viscosity of about 0.6 to about 1.2 dl per gram (at a concentration of about 0.5 grams per 100 ml of a solvent of equal volumes of trifluoroacetic acid and methylene chloride).

3. The process of claim 1 wherein said devolatilization is affected by heating said synthesized polyester to effect a weight loss of at least about 0.8% by weight.

4. The process of claim 1 wherein said shaping comprises molding said devolatilized polyester into a useful article.

5. The process of claim 1 wherein said shaping comprises spinning said devolatilized polyester into fibers and winding said fibers onto a package and further including the step of heat treating the package in inert atmosphere to increase the tenacity of said fibers to form a rewindable package with substantially no interfiber sticking.

6. The process of claim 1 wherein said devolatilizing step comprises heating said polyester while in particulate form to a temperature of at least about 220° C. and for a time of at least about four hours in an oven equipped with an inert gas purge.

* * * * *